United States Patent [19]

Iwata

[11] Patent Number: 4,572,682

[45] Date of Patent: Feb. 25, 1986

[54] LUBRICATED UNIVERSAL JOINT

[75] Inventor: Nobuo Iwata, Sagamihara, Japan

[73] Assignee: Ricoh Company, Ltd., Japan

[21] Appl. No.: 556,144

[22] Filed: Nov. 29, 1983

[30] Foreign Application Priority Data

Nov. 29, 1982 [JP] Japan .......................... 57-180349[U]

[51] Int. Cl.⁴ .......................... B41J 1/24; F16D 3/26
[52] U.S. Cl. .................................. 400/144.2; 403/37;
464/11; 464/102; 464/119
[58] Field of Search ................................... 184/5, 102;
384/286–293; 403/37, 38, 39; 464/7, 8, 9, 11,
102, 103, 112, 114, 115, 117, 119, 120;
400/144.2

[56] References Cited

U.S. PATENT DOCUMENTS

| 98,885 | 1/1870 | Roberts | 464/119 |
|---|---|---|---|
| 956,912 | 5/1910 | Walters | 464/115 |
| 1,241,100 | 9/1917 | Eden | 464/115 |
| 1,411,468 | 4/1922 | Wood | 464/102 |
| 2,001,823 | 5/1935 | Knowlton | 384/287 |
| 3,097,424 | 7/1963 | Martiny | 464/11 X |
| 3,212,290 | 10/1965 | Walden | 464/112 X |
| 3,491,625 | 1/1970 | Schulze | 464/119 X |
| 4,106,611 | 8/1978 | Suzuki et al. | 400/144.2 |
| 4,436,440 | 3/1984 | Iwata | 403/57 X |

FOREIGN PATENT DOCUMENTS 692868 6/1953 United Kingdom ................ 464/112

Primary Examiner—Donald Watkins
Assistant Examiner—Daniel P. Stodola
Attorney, Agent, or Firm—Guy W. Shoup

[57] ABSTRACT

A universal joint includes a transmission ring provided with two pairs of holes, a pair of rotating shafts whose integrally provided pins are slidably fitted into the corresponding holes and a lubricating ring fitted onto the transmission ring with a predetermined clearance therebetween to maintain a lubricant therein. Thus, the sliding engagement between the pins and the holes may be maintained lubricated at all times.

10 Claims, 3 Drawing Figures

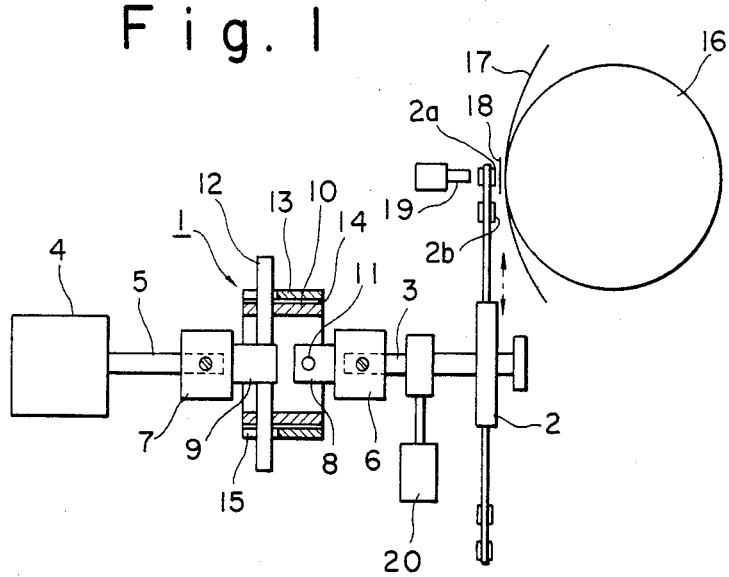
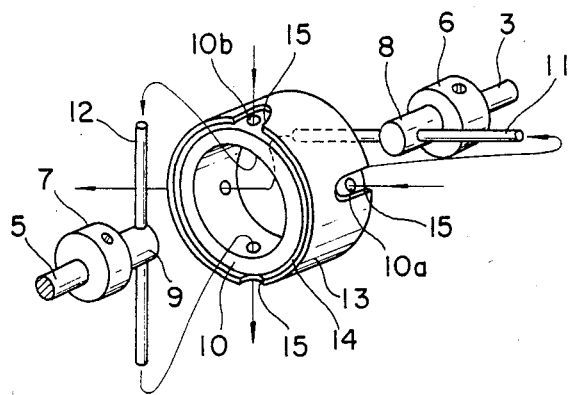
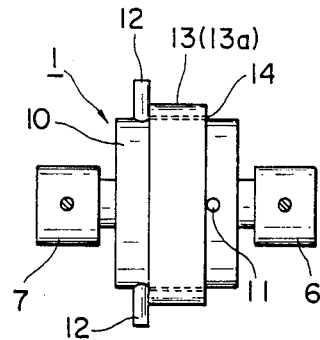

LUBRICATED UNIVERSAL JOINT

BACKGROUND OF THE INVENTION

1. Field of the Invention

This invention generally relates to a coupling device for connecting shafts together for power transmission, and particularly to a universal joint for transmitting rotating power between two shafts. More specifically, the present invention relates to a universal joint particularly suited for use in a rotating mechanism of wheel printer for rotating a print wheel to have a selected type located at the printing position.

2. Description of the Prior Art

A universal joint as a linkage for transmitting rotating power between two shafts is well known in the art. A universal joint is often used in a wheel printer in which a print wheel comprising a hub, a plurality of spokes extending radially outwardly from the hub and a plurality of type elements provided at the forward ends of the spokes is rotatably supported. That is, in a wheel printer, a universal joint is used to operatively couple a driving shaft, which is driven to rotate, for example, by means of a motor, to a driven shaft on which is fixedly mounted the print wheel. In such a universal joint utilized in wheel printers, it is often so structured that the one of the two shafts coupled by the universal joint may shift in parallel with respect to the other. Such a structure is particularly advantageous if use is made of a double circular print wheel which has type elements arranged in two circles, inner and outer, because the print wheel must be moved in the direction perpendicular to its rotating axis so as to locate a selected type element in either inner or outer circle at a predetermined printing position.

In the case of the universal joint having the above-described structure, it is important that the shafts may shift in parallel with respect to each other quite smoothly. If not, imprints will be poor in quality and an increased amount of power will be required. In addition, the speed of printing operation and its service life will be limited.

SUMMARY OF THE INVENTION

Therefore, it is a primary object of the present invention to provide an improved coupling device.

Another object of the present invention is to provide an improved universal joint for connecting two shafts to transmit rotating power therebetween wherein one of the shafts may move in parallel with respect to the other.

A further object of the present invention is to provide a lubricated universal joint which is so structured to allow smooth relative motion between the two shafts coupled by the joint.

A still further object of the present invention is to provide a universal joint which is particularly suited for use in wheel printers.

Other objects, advantages and novel features of the present invention will become apparent from the following detailed description of the invention when considered in conjunction with the accompanying drawings.

BRIEF DESCRIPTION OF THE DRAWINGS

FIG. 1 is a schematic illustration showing the universal joint constructed in accordance with one embodiment of the present invention when applied to the rotating mechanism of a wheel printer;

FIG. 2 is an exploded, perspective view showing the universal joint employed in the structure of FIG. 1; and FIG. 3 is a side view showing the universal joint constructed in accordance with another embodiment of the present invention.

DESCRIPTION OF THE PREFERRED EMBODIMENTS

Referring now to FIG. 1, there is shown a universal joint 1 constructed in accordance with one embodiment of the present invention and applied to the print wheel rotating mechanism of a wheel printer. As shown, the universal joint 1 is interposed between a supporting shaft 3 on which a print wheel 2 is fixedly mounted and a power shaft 5 which is connected to a pulse motor 4. The supporting shaft 3 is integrally connected to a driven shaft 8 of the universal joint 1 through a connector 6, and, similarly, the power shaft 5 is integrally connected to a driving shaft 9 of the universal joint 1 through another connector 7. A sliding pin 11 is fixedly mounted on the driven shaft 8 as extending in the direction perpendicular to the rotating axis of the driven shaft 8, and the pin 11 is slidably received in a pair of holes 10a, 10a formed oppositely in a transmission ring 10. Similarly, a sliding pin 12 is fixedly mounted on the driving shaft 9 as extending in the direction perpendicular to the rotating axis of the driving shaft 9, and the pin 12 is slidably received in a pair of holes 10b, 10b formed oppositely in the ring 10. It is to be noted that the holes 10a, 10a and 10b, 10b are so located that the pins 11 and 12 cross at right angles when slidably fitted in the corresponding holes. With this structure, either one of the two driving and driven shafts 8 and 9 may be shifted in parallel with respect to the other while maintaining the rotating power transmission relation.

In accordance with the present invention, the universal joint 1 further includes a lubricating ring 13 as loosely fitted onto the outer peripheral surface of the transmission ring 10 with a predetermined clearance 14 therebetween. As more clearly shown in FIG. 2, the lubricating ring 13 is formed with notches 15, thereby preventing the lubricating ring 13 from interfering with the sliding movement of the pins 11 and 12 with respect to the transmission ring 10. It is to be noted that such a relief structure may be provided in various different manners obvious for those skilled in the art; for example, slots or holes may be provided instead of the notches. It should further be noted that the lubricating ring 13 may also be provided as an inner ring which may be loosely fitted into the transmission ring 10. The size of clearance 14 should be determined in accordance with various factors, such as density of the lubricant to be used and operating temperature, which may affect the lubricating function between the pins 11, 12 and the ring 10. In addition, the lubricating ring 13 itself may be made of an oil-absorbing material, which allows to keep the connection between the pins 11, 12 and the ring 13 lubricated for an extended period of time.

The print wheel 2 is comprised of a hub which is fixed to the supporting shaft 3, a plurality of spokes extending radially outwardly from the hub and a plurality of type elements 2a and 2b provided at the forward or free ends of the spokes. As shown in FIG. 1, in the present print wheel 2, type elements are arranged in two concentric circles and the type elements 2a are arranged in the outer circle with the type elements 2b arranged in the inner circle. Such a double circular arrangement is advantageous because more type elements may be provided and/or the print wheel may be made smaller in size. A shifting mechanism 20 is provided such that it can cause the supporting shaft 3 to be shifted in parallel with respect to the power shaft 5 as indicated by the arrow, thereby allowing to locate a selected type element in either inner or outer circle at a predetermined printing position. There is also shown a platen roller 16 around which a sheet of recording paper 17 is placed. An ink ribbon 18 is held as interposed between the print wheel 2 and the sheet of recording paper 17. Also provided is a printing hammer 19 which may strike the selected type element to form an imprint on the recording sheet 17. Thus, the location of the printing hammer 19 in effect determines the printing position.

In operation, when a type element selection signal is applied to the pulse motor 4, the power shaft 5 is driven to rotate and its rotating power is transmitted to the supporting shaft 3 through the present universal joint 1, so that the print wheel 2 is caused to rotate over a desired angle to have the selected type element, or the type element 2a in the outer arrangement circle in the illustrated example, located at the printing position. Then, the printing hammer 19 is activated to cause the selected type element now located at the printing position is pressed against the platen roller 16 with the ink ribbon 18 and recording sheet 17 sandwiched therebetween, so that an imprint of the selected type element is formed on the recording sheet 17.

On the other hand, if the selected type element is present in the inner arrangement circle, the shifting mechanism 20 is activated to cause the supporting shaft 3 to be shifted upward with respect to the power shaft 5 which is stationary in position other than rotation. As a result, the selected type element 2b may be located at the printing position with its back surface opposed to the impacting front surface of the printing hammer 19. Then, the motor 4 is driven to cause the power shaft 5 to be rotated, which rotation is then transmitted to the supporting shaft 3 via the present universal joint 1, so that the print wheel 2 may be rotated over a desired angle to locate the selected type element at the printing position. In this case, the rotating axes of the power and supporting shafts 5 and 3 are not in alignment but shifted in parallel, and such a relative parallel movement between the power and supporting shafts 5 and 3 is accommodated by the sliding motion between the pins 11, 12 and the transmission ring 10.

In accordance with the present invention, since the lubricating ring 13 is additionally provided to be loosely fitted onto the transmission ring 10, any desired lubricant such as oil may be held in the clearance between the inner and outer rings as a source of lubricant to be supplied to the sliding connection between the pins 11, 12 and the ring 10. Put it another way, the clearance 14 may serve as a source of supplying the lubricant to the holes 10a and 10b to insure smooth sliding motion between the pins 11, 12 and the ring 10. Thus, the supply of lubricant to the holes 10a and 10b may be carried out automatically for an extended period of time.

FIG. 3 shows another embodiment of the present invention and in this embodiment the width of ring 13 is limited to slightly short of the distance between the holes 10a and 10b in the axial direction of the ring 13. With this structure, there is no need to provide notches 15 and thus it is easy to make. In this case, however, it is preferable to provide a means for forming the two rings 10 and 13 unitary in rotation, thereby prohibiting to produce any relative rotational motion between the two rings 10 and 13.

While the above provides a full and complete disclosure of the preferred embodiments of the present invention, various modifications, alternate constructions and equivalents may be employed without departing from the true spirit and scope of the invention. For example, the lubricating ring 13 is preferably made of any oil-resistant material, whether it is metal or synthetic resin. Furthermore, the field of application of the present universal joint should not be limited only to printers as described above and it may also be applied to various other fields. Therefore, the above description and illustration should not be construed as limiting the scope of the invention, which is defined by the appended claims.

I claim:

1. A coupling device for transmitting a driving power from a driving source to an object to be driven, comprising:
    a first ring member;
    first and second sliding means provided in said first ring member and spaced apart over a predetermined distance along an axial direction of said first ring member;
    a first rotating shaft connectable to either one of said driving source and object and having an integrally provided first pin which is slidably fitted in said first sliding means and extends in a first radial direction of said first ring member;
    a second rotating shaft connectable to the other of said driving source and object and having an integrally provided second pin which is slidably fitted in said second sliding means and extends in a second radial direction of said first ring member perpendicular to said first radial direction; and
    a second ring member loosely fitted to and substantially coaxial with said first ring member with a predetermined clearance between said first and second ring members for use as a storage space for storing a quantity of lubricant to be supplied to said first and second sliding means, said second ring member being interposed between said first and second pins so as to be kept in position.

2. A device of claim 1 wherein each of said sliding means includes a pair of holes formed in said first ring member opposite to each other, and said pins are slidably fitted in said respective holes.

3. A device of claim 2 wherein each of said shafts is fixedly connected to the corresponding one of said pins at its center.

4. A device of claim 2 wherein said second ring member is provided with notches corresponding in position to said holes of said first ring member.

5. A device of claim 2 wherein said second ring member has a width slightly smaller than the distance between the two pairs of holes in the direction of rotating axis of said first ring member.

6. A device of claim 1 wherein each of said first and second rotating shafts includes a connector for coaxial connection to a desired body.

7. A device of claim 1 wherein said second ring member is provided as loosely fitted around said first ring member.

8. A device of claim 1 wherein said object to be driven includes a print wheel including a hub fixedly mounted on either one of said first and second rotating shafts, a plurality of spokes extending radially outwardly from said hub and a plurality of type elements provided on said spokes.

9. A device of claim 8 wherein said plurality of type elements are arranged in a pair of inner and outer concentric circles.

10. A device of claim 9 further comprising means for shifting said either one of said first and second rotating shafts having mounted thereon the hub of said print wheel in a direction perpendicular to the axial direction of said either one of said first and second rotating shafts so as to locate a selected one of said plurality of type elements in either of said inner and outer circles at a predetermined printing position.

* * * * *